US012680834B2

(12) United States Patent
Atkeson et al.

(10) Patent No.: US 12,680,834 B2
(45) Date of Patent: Jul. 14, 2026

(54) SYSTEM AND METHOD FOR VALIDATING STREAMING SENSOR DATA IN A UTILITY MONITORING SYSTEM

(71) Applicant: Badger Meter, Inc., Milwaukee, WI (US)

(72) Inventors: Christopher Atkeson, Los Gatos, CA (US); Arthur G. Ryman, Thornhill (CA); Shahram Javey, Los Gatos, CA (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 17/838,014

(22) Filed: Jun. 10, 2022

(65) Prior Publication Data

US 2023/0400332 A1 Dec. 14, 2023

(51) Int. Cl.
*G01D 4/00* (2006.01)

(52) U.S. Cl.
CPC ............. *G01D 4/002* (2013.01); *G01D 4/008* (2013.01); *G01D 2204/47* (2021.05)

(58) Field of Classification Search
CPC .... G01D 4/002; G01D 4/008; G01D 2204/47; G01D 2204/22; G01D 2204/26; G01D 4/006; G01D 4/004; H04Q 9/00
See application file for complete search history.

(56) References Cited

U.S. PATENT DOCUMENTS

| | | | | |
|---|---|---|---|---|
| 6,088,659 A | * | 7/2000 | Kelley | G06Q 30/06 709/201 |
| 7,383,721 B2 | | 6/2008 | Parsons et al. | |

(Continued)

FOREIGN PATENT DOCUMENTS

| | | |
|---|---|---|
| CN | 113037643 A | 6/2021 |
| CN | 113447875 A | 9/2021 |

(Continued)

OTHER PUBLICATIONS

KR-102233841-B1 English Language Translation (Year: 2021).*
International Search Report and Written Opinion dated Oct. 4, 2023 for PCT/US2023/024918.

*Primary Examiner* — Steven Lim
*Assistant Examiner* — Jerold B Murphy
(74) *Attorney, Agent, or Firm* — Boyle Fredrickson SC

(57) ABSTRACT

A computer-implemented system for validating meter data in a utility monitoring system based on streamed sensor data is described. The system includes a metering analytics system configured to receive a stream of meter data received from sensors in or in proximity with utility meters, the meter sensor data being generated by the sensors and a central event management system for validating meter sensor data in the streamed sensor data based on a plurality of sequential sensor reads in the streamed sensor data. The central event management system is configured to receive an invalidation event definition defining a sensor value usage invalidation threshold, apply the invalidation event definition to read messages received through the streamed sensor data, monitor read messages in the streamed sensor data to identify a first read message for a watched meter, and identify an invalid meter satisfying the invalidation event definition based upon receipt of at least a second read message for the violating meter indicating that the meter sensor data is outside of a defined range for the sensor value usage invalidation threshold range.

12 Claims, 6 Drawing Sheets

(56)                    References Cited

U.S. PATENT DOCUMENTS

| | | |
|---|---|---|
| 8,600,556 B2 | 12/2013 | Nesler et al. |
| 8,650,069 B2 | 2/2014 | Mason, Sr. et al. |
| 9,273,983 B2 | 3/2016 | Sonderegger |
| 9,644,992 B2 | 5/2017 | Wada et al. |
| 9,898,339 B2 | 2/2018 | Blumenfeld et al. |
| 10,241,505 B2 | 3/2019 | Cohen et al. |
| 10,274,969 B2 | 4/2019 | Klein et al. |
| 10,394,206 B2 | 8/2019 | Kantor et al. |
| 10,534,378 B1 | 1/2020 | Eyring et al. |
| 2015/0212122 A1 | 7/2015 | Sobotka et al. |
| 2020/0267915 A1* | 8/2020 | Ferras .................. A01G 25/167 |
| 2021/0140151 A1 | 5/2021 | Johnson et al. |
| 2021/0373583 A1 | 12/2021 | Klein et al. |
| 2022/0294217 A1* | 9/2022 | Spalt ....................... H02J 3/003 |

FOREIGN PATENT DOCUMENTS

| | | | |
|---|---|---|---|
| CN | 114419788 A | | 4/2022 |
| KR | 102233841 B1 | * | 3/2021 |

* cited by examiner

SYSTEM AND METHOD FOR VALIDATING STREAMING SENSOR DATA IN A UTILITY MONITORING SYSTEM

FIELD OF THE INVENTION

This application relates to an event generation and detection system and method for enabling water utilities to detect anomalies from time series data generated by their sensors. More specifically, this application relates to a system and method for identify and monitoring the effectiveness and operation of a rain aware irrigation system.

BACKGROUND

Utility providers use a network of utility meters located at network endpoints, where the utility being provided exits a distribution network and is provided to customers or end users. The flow of the utility being used by the customers or end users is measured and monitored at these utility meters. The utility meters may further include additional sensors to facilitate utility provision, monitoring, and measurement such as water quality sensors, temperature sensors, pressure sensors, etc. Automatic meter reading (AMR) systems typically read the meter data from the individual meters and provide the readings through utility meter radio transmitters operating in a local area network to communicate with radio receivers, often mounted on a rooftop or a utility pole. The receivers also sometimes operate as gateways, for collecting meter data from the transmitters and then transmitting the meter data through a second network to a central office. The meter data is transmitted from the receivers or gateways to the central office to a data management system such that the data can then be used for processing into customer statements of account, utility usage monitoring, etc.

Meter management systems and methods are computer-implemented systems and programs configured to manage data collection and storage of utility information received from the meters. Meters can measure utility flow continuously or over an interval. In typical operation, measurements are taken every fifteen minutes, or four time per hour. Utility meters typically report the measured data every four hours or six times per day. Accordingly, each utility meter generates ninety-six measurements and six data reports per day. A large city like New York having approximately three million households can generate 300 million utility measurements in a day.

The volume of data is significant for meter management systems related to the management, storage, and utilization of the collected data. Although the volume of data is processed and stored in massive information database for use by utility companies and their customers, there is increasing demand for access to and utilization of data.

What is needed is a meter data management system and method that provides and utilizes meter data as it is received from utility meters. What is further needed is such a system and method that uses streamed meter data to analyze and validate data receive in a meter data stream.

SUMMARY OF THE INVENTION

The present invention is directed to validate received messages in a meter data stream. The invention is further directed to such a system configured to receive non-meter sensor data in the meter data stream to implement the invention.

In one more detailed aspect, a computer-implemented system for validating meter data in a utility monitoring system based on streamed sensor data is described. The system includes a metering analytics system configured to receive a stream of meter data received from sensors in or in proximity with utility meters, the meter sensor data being generated by the sensors and a central event management system for validating meter sensor data in the streamed sensor data based on a plurality of sequential meter reads in the streamed sensor data. The central event management system is configured to receive an invalidation event definition defining a sensor value usage invalidation threshold, apply the invalidation event definition to read messages received through the streamed sensor data, monitor read messages in the streamed sensor data to identify a first read message for a watched meter, and identify an invalid meter satisfying the invalidation event definition based upon receipt of at least a second read message for the violating meter indicating that the meter sensor data is outside of a defined range for the sensor value usage invalidation threshold range.

In another embodiment of the invention, the first read message is replaced by the second read message wherein there is no indication that the invalid meter is inside of the defined range based on the at least second read message. The central event management system may be further configured to identify a subset of meters to which the invalidation event definition is to be applied based on historical readings for the meters in the subset of meters and monitoring read messages in the streamed sensor data to identify a first read message for each meter in the subset of meters.

In another embodiment, the central event management system may be further configured to modify the defined range based on the historical readings for the meter or sensor.

In yet another embodiment, the central event management system may be further configured to provide a notification to a utility associated with the invalid meter. The notification to the utility customer associated with the invalid meter can be transmitted upon receipt of the at least second read message.

In another more detailed aspect computer-implemented method for validating meter data in a utility monitoring system based on streamed sensor data is described. The method includes receiving a stream of meter data received from sensors in or in proximity with utility meters, the meter sensor data being generated by the sensors and validating meter sensor data in the streamed sensor data based on a plurality of sequential meter reads in the streamed sensor data. Validating the meter sensor data includes receiving an invalidation event definition defining a sensor value usage invalidation threshold, applying the invalidation event definition to read messages received through the streamed sensor data, monitoring read messages in the streamed sensor data to identify a first read message for a watched meter, and identifying an invalid meter satisfying the invalidation event definition based upon receipt of at least a second read message for the violating meter indicating that the meter sensor data is outside of a defined range for the sensor value usage invalidation threshold range.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

The present application is directed to a advanced metering analytics system and method configured for collection, processing and analysis of utility information during receipt of streaming data from utility meters. The system and method may be used within an advanced metering infrastructure in combination with additionally utility metering systems and non-utility systems as described in further detail below.

Figure 1:
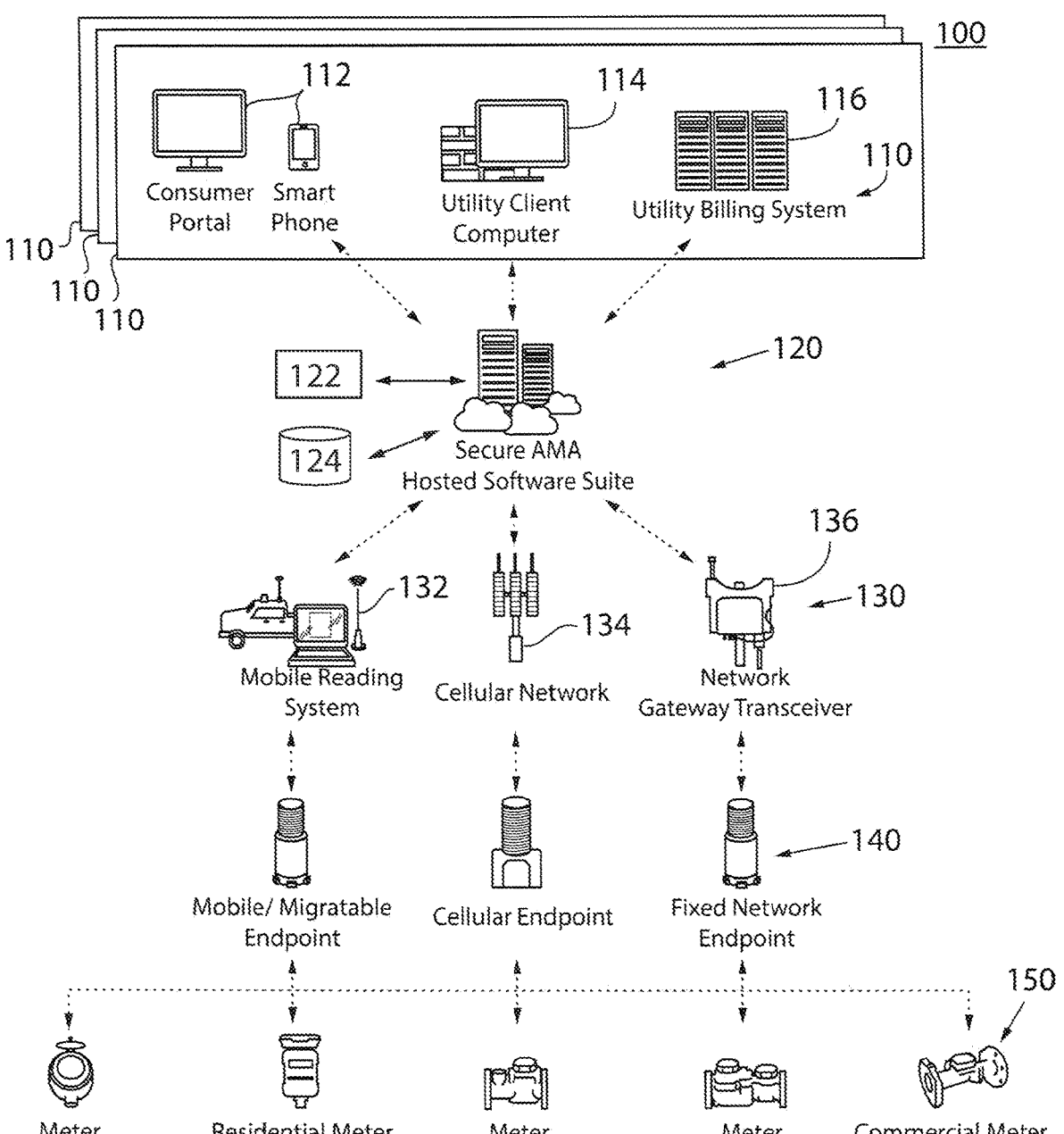
FIG. 1 is a representative diagram of an advanced metering infrastructure (AMI), according to an exemplary embodiment.

Referring first to FIG. 1, a representative diagram of an advanced metering infrastructure (AMI) 100 is shown, according to an exemplary embodiment. AMI 100 is an integrated system of a plurality of utility data management systems 110, an advanced metering analytics (AMA) system 120, communications networks 130, metering endpoints 140, and utility meters 150 that collectively monitor and communicate meter related data and enable two-way communication between utility providers and utility consumers. AMI 100 provides a number of important functions that were not previously possible or had to be performed manually, such as the ability to automatically and remotely measure utility use, facilitate the operation of consumer information management systems, connect and disconnect service, detect tampering, identify and isolate outages and/or leaks, and monitor utility use, etc. For simplicity, the application herein forward will reference a water utility, but it should be understood that the systems and methods described herein are equally applicable to other utilities.

In one exemplary embodiment, each utility data management system 110 may include consumer portal systems 112, utility client computers 114 and utility billing systems 116. Consumer portal systems 112, utility client computers 114 and utility billing systems 116 may be configured for interactions between utility providers and utility consumers. Consumer portal systems 112 may be configured to provide utility customers with access to their water consumption data, allowing them to view their usage activity, allowing them to facilitate generation consumer defined events as described below and gain a greater understanding and control of the water they consume. Utility billing systems 116 may be configured to provide traditional billing functions based on utility consumption. Utility client computer systems 114 may be configured to implement system management functions, such as to provide the hosted software platform, system maintenance, software support, and management information. Utility client computer systems 114 may further be configured to facilitate generation of utility defined events as also described below.

In an exemplary embodiment, each utility data management system 110 is implemented by a single utility provider with their own interfaces, business rules, billing mechanisms, etc. that are unique to that utility provider. Accordingly, each utility data management system 110 will interact with the advanced metering analytics system 120 in a different manner such as frequency of meter data uploads, granularity of meter data uploaded, etc. Such customizations may be implemented within a utility data management system 110 and/or within the analytics system 120. Accordingly, analytics system 120 provides services to multiple utilities, each with their own utility data management system 110 and associated data models, data integrity constraints, business rules, etc.

Advanced metering analytics system 120 is a system and method for aggregating utility data collected over communication networks 130 from endpoints 140 in communication with meters 150. System 120 collects meter data for reporting to billing systems 116 and for display through consumer portal systems 112. System 120 further cooperates with client computers 114 to report collected meter data, implement leak detection, and shut off functions for particular meters, etc. In the present invention, system 120 includes a central event management system, described below with reference to FIG. 2, and is configured to include a data management system for implementing the sensor-centric datastore. Analytics system 120 may further include a non-utility data management system 122 configured to receive and process data from non-utility sources as also described below with reference to FIG. 2. Analytics system 120 further includes a meter data datastore 124. Although system 122 and datastore 124 are shown externally to system 120, it should be understood that these components may be internal components of analytics system 120.

Communications networks 130 may be one or more of a mobile network 132, a cellular network 134, a fixed network 136, etc. to communicate the meter data from endpoints 140 to analytics system 120. For example, wherein network 130 is a fixed network, fixed network transceiver assemblies are used, as opposed to mobile transceivers carried in a vehicle or carried by a human employed for mobile networks 132 to collect meter data.

Metering endpoints 140 can receive data (e.g., messages, commands, etc.) from meters 150 and transmit meter data or other information to the AMA system 120. Depending on the exact configuration and types of devices used, the endpoint devices 140 transmit standard meter readings either periodically ("bubble-up"), in response to a wake-up signal, or in a combination/hybrid configuration. In each instance, the endpoint devices 140 are configured to exchange data with devices of the analytics system 120 through communication networks 130.

Utility meters 150 are shown as fixed automatic meter reading systems for a water distribution system that include a meter and meter register assembly and/or encoder connected in a water line. The meter register in the assembly can display units of consumption. In one embodiment, the register uses a pulse transmitter to convert the mechanical movements of the meter to electrical signals. An encoder may also be used as a register. In general, an encoder is a device or process that converts data from one format to another and is a device which can detect and convert mechanical motion to an analog or digital coded output signal. Meters 150 may include disc meters, ultrasonic meters, etc. to measure the utility flow through the measuring device as recorded by a register/encoder.

Utility meters 150 and endpoints 140 are typically battery powered and configured for energy conservation. Accordingly, meters 150 measure utility flow and/or generate sensor data every 15 minutes and store the generated data, locally, typically within an endpoint 140. Endpoints 140 archive the data for a period and transmit the archived data to communication networks every four hours. Although these rates and times are infinitely configurable, they provide an example of the amount of data generated by each meter 150 and endpoint 140. Meters 150 are typically associated with a single encoder 140, accordingly, meter, as used herein and unless otherwise understood, refers to a meter and encoder pairing.

A utility meter 150 and/or endpoint 140 may have one or more additional sensors. Many different types of utility measurement sensors are in widespread use, e.g., electricity, natural gas, oil, water, etc. to measure an amount being provided to a customer. Additional sensors may be associated with the meter and positioned within the body of the meter and/or near the meter within an endpoint location. Exemplary sensors may include, but are not limited to, backflow sensors, leak/moisture detectors, water quality sensors, water valve positioning sensors, pressure sensors, temperature sensors, etc.

Using the system and method described above, analytics system 120 is configured to receive and process the received data that includes a history of sensor readings and other data, collectively referred to as meter data. The analytics system 120 typically stores the received data in data store 124 and provides this data to the utility data management system 110 associated with the meter 150 for their operations. For example, a water utility provider must bill the consumption for a given time period to the occupant of the premises where the meter is installed for the time period and uses the meter data to do so. Sensor description data may be used to determine how the sensor data is used. Exemplary meter description data can include identification of the premises where the meter is installed, identification of the occupant for billing, identification of the resolution setting of the meter, etc. As a further example, water consumption may be reported in terms of unitless pulse counts whose correct translation into volume units requires a knowledge of the resolution setting of the meter. The resolution setting may be changed by the utility provider by replacing the meter, its encoder, etc.

Figure 2:
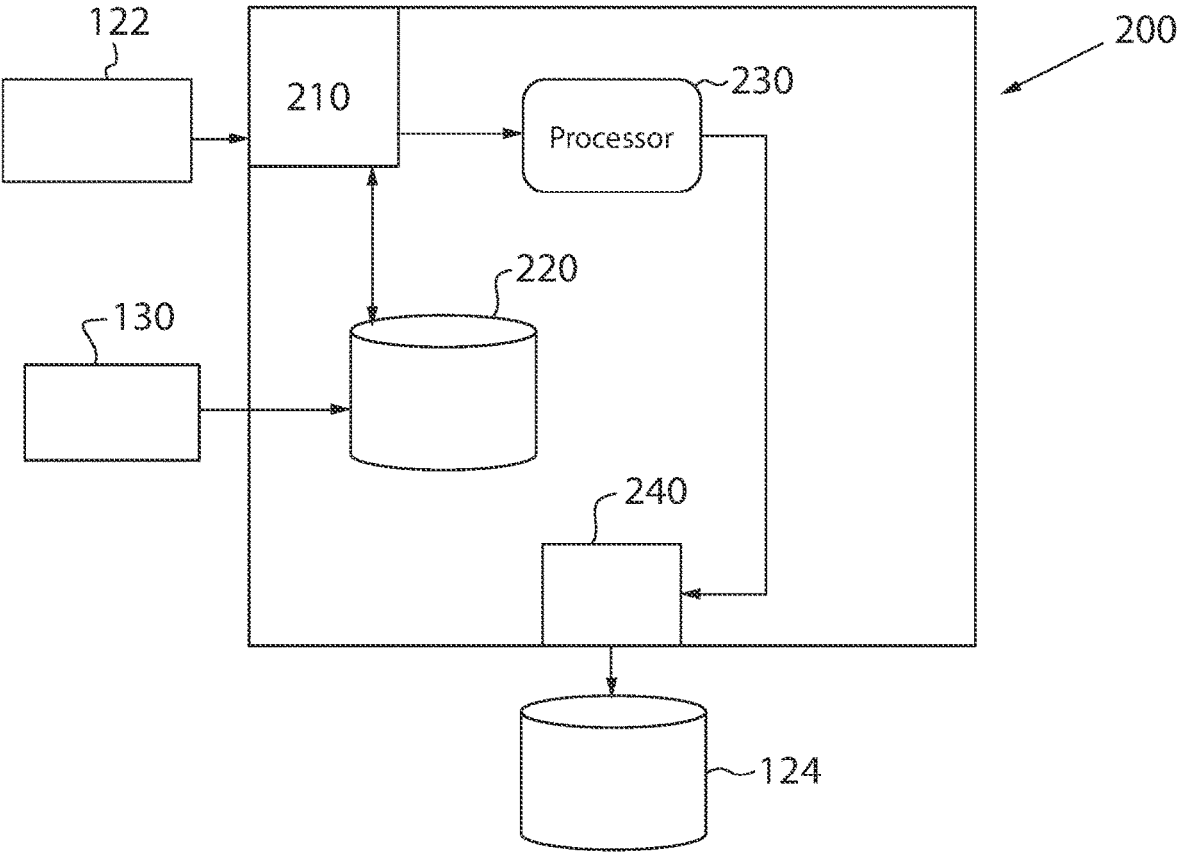
FIG. 2 is an advanced metering analytic system including a central event management system, according to an exemplary embodiment.

Referring now to FIG. 2, an exemplary embodiment of an advanced metering analytics system 200, shown as system 120 in FIG. 1, is shown, according to an exemplary embodiment. System 200 receives data from communication networks 130 and/or non-utility data management system 122 for processing and storage in meter data storage 124. As stated before, the incoming amount of data is significant at 96 reads per meter/per day and 2-3 million household residences in a typical large city. System 200 includes a central event management system 210, an event management memory 220, an advanced metering analytics processor 230 and a datastore interface 240. One of ordinary skill in the art should recognize that components shown as separate may be combined. For example, in an exemplary embodiment, central event management system 210 may be computer code stored in a non-volatile memory and executed by advanced metering analytics processor 230. Alternatively, central event management system 210 may include a separate processor executing code stored in the event management memory 220. Further, non-utility data management system 122 for processing and storage in meter data storage 124 are shown as external components but may alternatively be implemented within advanced metering analytics system 200.

Central event management system 210 is configured to receive sensor data from cellular endpoints 140 attached to water meters 150 through scheduled communications. System 210 decodes the data, send confirmation back to the meter that the message was received, and writes the data to event management memory 220. The endpoint 140 does not receive confirmation until the data has been successfully written to the event management memory 220. To accommodate the volume of data, system 210 writes the data to data stream 215. Stream 215 may be implemented as a serverless streaming data service that facilitates the capture, processing, and storage of data streams at any scale. Advantageously, stream 215 allows central event management system 210 to process and analyze data as it arrives instead of having to wait until all your data is collected and stored in data store 124. Accordingly, processing can begin upon arrival of the data, independent from long-term storage.

It is important to recognize that this data storage is a preliminary data storage and application to a data stream that is independent from traditional long-term data storage and archiving in datastore 124. In an exemplary embodiment, the data that central event management system 210 processes are a JavaScript object notation (JSON) dictionary with a deviceId, receivedOn, and messages field. The deviceId is a unique identifier for the endpoint and the receivedOn is the time that central event management system 210 received the information from the endpoint 140. The messages key contains a list of messages from the endpoint, where each message contains timestamped configuration and sensor information collected by the endpoint. Each message has a type, and each type has required fields and optional field. There can be different types and content of messages but the central event management system 210 only utilizes device_reads and encoder_changed message types, with the latter only important because of its effect on reads. Accordingly, traditional data storage of the remainder of the message types is performed by advanced metering analytics processor 230 and datastore 124 in traditional operations.

Reads, or messages received of type device_reads, are actual read values of the water meter 150 indicating cumulative flow through the meter. Each read has four fields: date, status, value, and type. The value indicates the cumulative pulse count. The date indicates the time of the reading. The status contains any self-reported information from the endpoint in the form of a string separated by |. The type indicates how the value was sampled. For, example, F can be for a Network read received automatically from the endpoint. M can be for a manual read by an inspector. I can be for an advanced read using some kind of device to read the meter (e.g. drive by reading).

Reads typically come in lists where the dates are spaced by some regular interval between reads. In the central event management system 210, reads are differenced to create flows and events, discussed in further detail below.

Encoder changes are messages that indicate when an endpoint 140 and/or meter 150 has been changed out, moved, or set up for the first time within system 100. Encoder changes include important information about the new components. For example, central event management system 210 uses dials to detect rollover or rollunder and meter size, meter units, and meter resolution to calculate if maximum possible flow was exceeded. When available, central event management system 210 uses this information to interpret the reads as also described below.

Each data type has its own index and field mapping when stored to event management memory 220. Reads and Encoder Changes are immutable data types that are minimally enriched and written to event management memory 220.

Flows are generated from reads and encoder changes. An exemplary flow is generated from two sequential reads and will include, among other fields, a start_read value and an end_read value, the difference of which is the flow delta for the time period between the two read messages. Flows are not messages received from devices 140, they are calculated by central event management system 210 from two sequential reads.

To calculate the flow from read values, central event management system 210 determines the number of dials on the meter. The number of dials determines the maximum possible read value for the meter and is used to distinguish between backflow and rollover events or forward flow and rollunder events. Rollover and rollunder occur when the read value on a meter crosses over the minimum or maximum possible read value resetting the reading. For example, on a 4-dial meter, having a start reading of 9990 and an end reading of 10 is much more likely to be a forward flow of 20 than a back flow of 9980. central event management system 21 classifies this event to be a rollover event. Rollunder is the reverse of this, and it occurs when the dials pass through 0 through backflow and end up at a very high read value. Central event management system 210 can determine the maximum read value of the meter using the number of dials.

To determine the number of dials, central event management system 210 first check if there is encoder information for the read with the dials field, for example stored within data store 124 or available from a utility system 110. If this is the case, then central event management system 210 uses this value as the dials value. If this information is not present, central event management system 210 determined the number of dials by setting dials=max(num digits(max (device reads[read value])), 4). In other words, central event management system 210 takes the maximum read value in the batch of reads, check the number of digits in the read value, and then estimates the dials to be the number of digits with a minimum of 4. Central event management system 210 calculates the maximum read value using the number of dials and uses this information as well as the read values to calculate the flow. The smallest difference is used as the most likely correct interpretation of the reads. Central event management system 210 may be further configured to identify flow anomalies and calculate estimated flow as data is received from data stream 215.

Similarly, events are also generated from reads and encoder changes. An exemplary event generated from 41 sequential reads may be used to define a leak event. The 41 sequential reads may be received, processed and stored within the event management memory 220 as the reads are received. Accordingly, the leak detection event is determined independent from traditional data mining operations that may be performed on datastore 124.

Similar to flows, events are also dependent on sequences of reads. Events indicate the occurrence of something for a certain device 140, 150 over a time period. In order to create events, central event management system 210 defines the one or more conditions which indicate an event is occurring. For example, a leak event may be defined as occurring when a first condition indicated that the flow is greater than 0 and the aggregation interval is less than or equal to the maximum supported interval for a particular meter 150 type. For anomalies and exceptions, the occurrence of an event is as simple as the presence of a certain anomaly or exception.

There are three operations which are performed on events: event creation, event updating, event ending. Each event may be defined by several key fields, such as: update date, time that the lambda created/updated/ended the event; event date range; field indicating a start and an end time for the event; event open, indicating if the event is ongoing or ended; event name: indicating the type of event; and duration seconds, indicating how long the event is. Not all fields are required. For example, ongoing events do not have an end time.

In operation, given two sequential reads, central event management system 210 create an event when the later read has the occurrence of an event and the first read does not have the occurrence. An event is updated when both reads have the occurrence of the event. Central event management system 210 ends an event when the first read has an occurrence of an event and the later read does not. Exemplary events can include indications of endpoint tampering, a read rollover, a leak event, etc.

Flows and Events are data types computed from reads and encoder changes and are subject to invalidation when new data enters central event management system 210. They are subject to invalidation when a read sequence changes. For example, out of sequence reads occur when central event management system 210 receive reads that are not at the end of our read time series. When we have one of these reads is identified, central event management system 210 need to recalculate certain flows and events. System 210 performs the recalculation by deleting the flows and events for the device and recalculating them using the new reads and encoder sequence.

Figure 3:
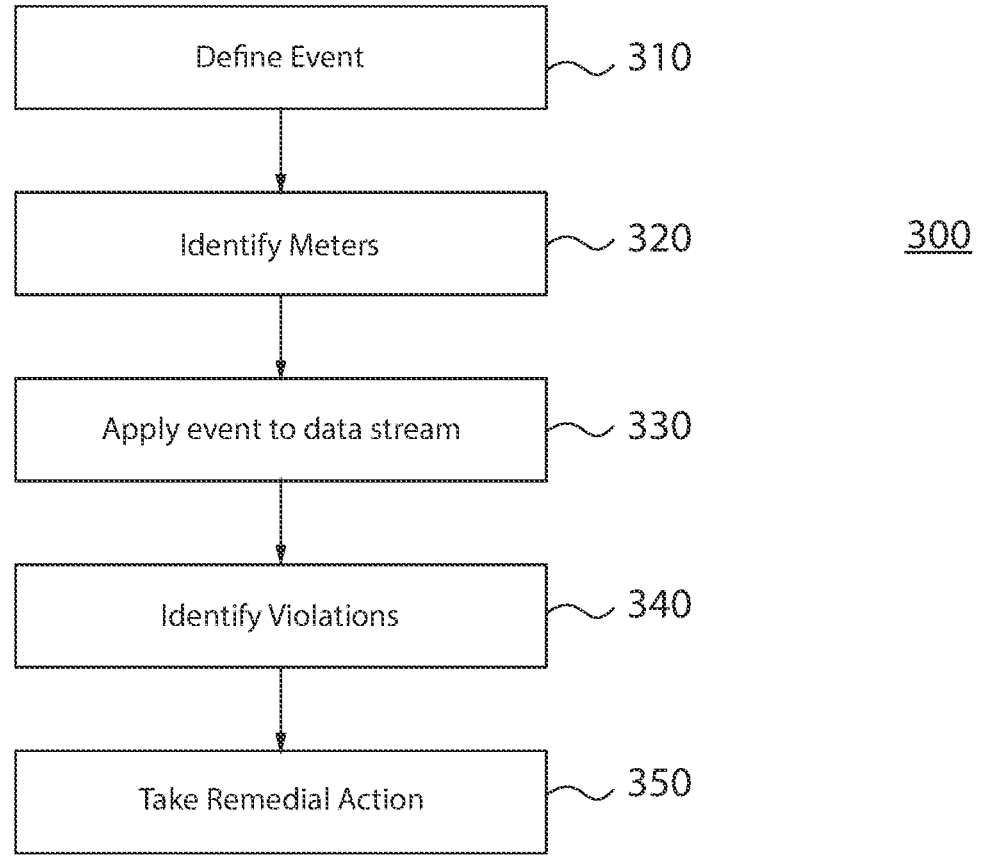
FIG. 3 is a flowchart illustrating a method for detecting violation of water usage guidelines in the central event management system of FIG. 2, according to an exemplary embodiment.

Referring now to FIG. 3, a flowchart 300 illustrating a method for using central event management system 210 for real time identification of water usage violations is shown, according to an exemplary embodiment. The method may be implemented by a computer processor of the central event management system 210 and/or one or more independent data stores, such as non-utility data management systems 122 and utility data management systems 110. The computer system implementing the method may include a processor configured to implement a computer program stored in nonvolatile memory to implement the functionality described herein.

Government entities at various levels (e.g. state, city, district) may from time to time impose water usage guidelines when necessary in order to manage limited water supplies. For example, during a drought it may be necessary to limit when residential lawns can be watered. Typical rules include assigning certain days of the week or month (e.g. even-odd) to home owners based on their addresses (e.g. even-odd street numbers). Furthermore, lawn irrigation may be limited to certain times of the day (e.g. early morning, evening). Central event management system 210 may be utilized to overcome the difficulty of enforcing such guidelines using manpower-based approaches. At most, spot checks could be performed.

Central event management system 210 provides a simple and effective solution when customer information is available. Specification, customer information includes the street address of each water meter. The water usage guidelines can be translated into event conditions within central event management system 210 that detect irrigation at residential locations that violate the conditions for the given address.

Based on a detected event violation, central event management system 210 may be configured to send a message to a utility client computers 114 and/or consumer portal system 112 providing a warning notification informing them that they are violating the guidelines. The utility customer may be provided with a time and/or series of messages over a reasonable time period to remedy the situation, e.g. by reprogramming an automatic irrigation system. However, if the violation persists, central event management system 210 may be configured to note the extended violation and provide notification to utility client computers 114 such that the water utility could send a report to the responsible government agency who could then enforce the guidelines and/or utility client computers 114 can exercise direct control to limit water usage by capping or otherwise limiting flow to the customer.

In a step 310, a utility client computer 114 can be used to define an irrigation event. The event definition may utilize the flow field to define the amount of flow over a defined time period that is to be designated as indicative of irrigation.

However, it is insufficient to identify irrigation for every meter for example, where the guidelines state that irrigation may occur on odd or even days for odd or even street numbers. Accordingly, in a step 320 the meters to which the irrigation event is to be identified may also be determined, such that the irrigation event will only be applicable to those specific meters. The irrigation event may be automatically updated based on the determination that the day is odd or even. Thereafter, the irrigation event may be only applied for the identified meters in central event management system 210 in a step 330 and violators can be identified in a step 340. One of ordinary skill in the art would understand that these steps may be performed in a variety of manners to implement the functionality described herein. For example, central event management system 210 can generate a listing of all meters having irrigation events and the list can be sorted into violators and non-violators in a utility client computer 114 in an alternative step 340.

Advantageously, central event management system 210 is monitoring the stream data such that the potential violations can be identified based on as little as two sequential messages. Accordingly, violations can be identified in advance of violations identified by traditional data mining techniques. Thereafter, remedial actions may be taken in a step 350 more quickly.

Figure 4:
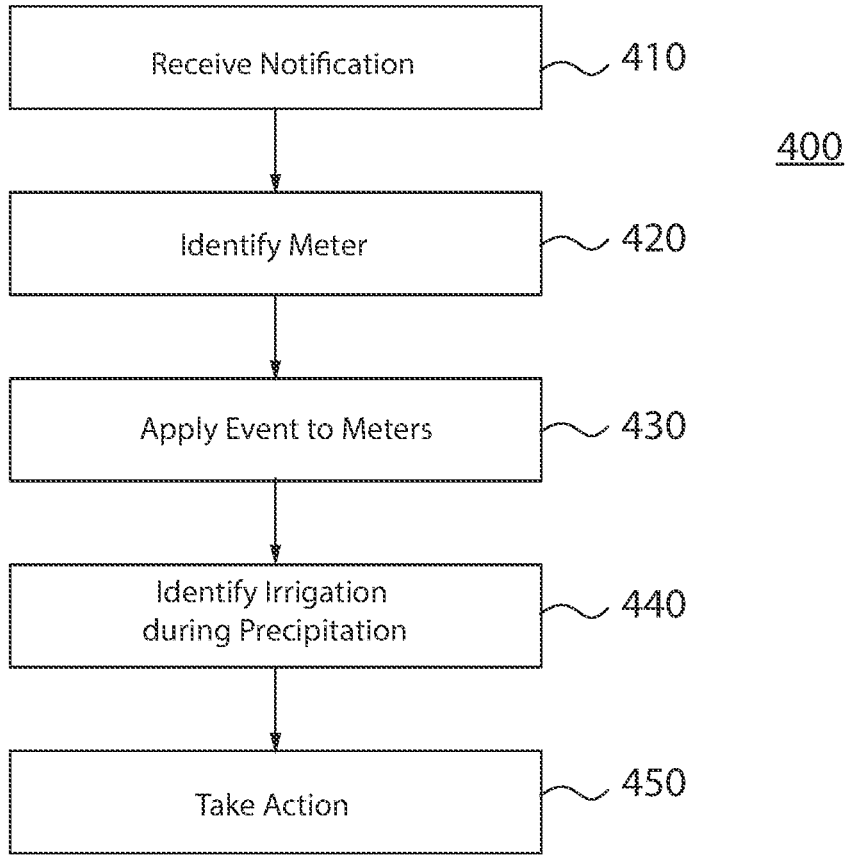
FIG. 4 is a flowchart illustrating a method for detecting violation of water usage guidelines in the central event management system of FIG. 2, according to an exemplary embodiment.

Referring now to FIG. 4, a flowchart 400 illustrating a method for using central event management system 210 for determining the effectiveness of precipitation-aware irrigation systems is shown, according to an exemplary embodiment. The method may be implemented by a computer processor of the central event management system 210 and/or one or more independent data stores, such as non-utility data management systems 122 and utility data management systems 110. The computer system implementing the method may be configured to include a processor configured to implement a computer program stored in nonvolatile memory to implement the functionality described herein.

Some irrigation systems claim to reduce the volume of water used in response to the level of precipitation. Central event management system 210 may be used in combination with weather data, especially precipitation, received from non-utility data system 122 to generate a quantitative assessment of the effectiveness of such irrigation systems.

A user of a precipitation-aware irrigation system can provide an indication to a utility data management systems 110, for example through a consumer portal system 112 indicating utilization of a precipitation-aware irrigation system in a step 410. Thereafter, central event management system 210 may be used to detect changes in the volume of irrigation in response to precipitation. For example, when the precipitation exceeded some corresponding threshold for identified meters in a step 420. Central event management system 210 or utility data management systems 110 determine the meters to which the precipitation occurred and whether the volume of water used exceeded some threshold in a step 430. If an irrigation event, as described above with reference to FIG. 3, is detected despite the precipitation for a meter in a step 440, a notification that the irrigation system was not functioning as expected can be sent in a step 450.

Advantageously, central event management system 210 is monitoring the stream data such that the effectiveness and/or any issues with the precipitation-aware sensors can be identified based on as little as two sequential messages. Accordingly, remedial can be taken in advance of awareness of the issue by traditional data mining techniques.

Similarly, event conditions could be set up to confirm that the irrigation system was functioning as expected. Also similarly, other weather information, such as temperature and humidity, could be used by smart irrigation systems and monitored by the central event management system 210.

Figure 5:
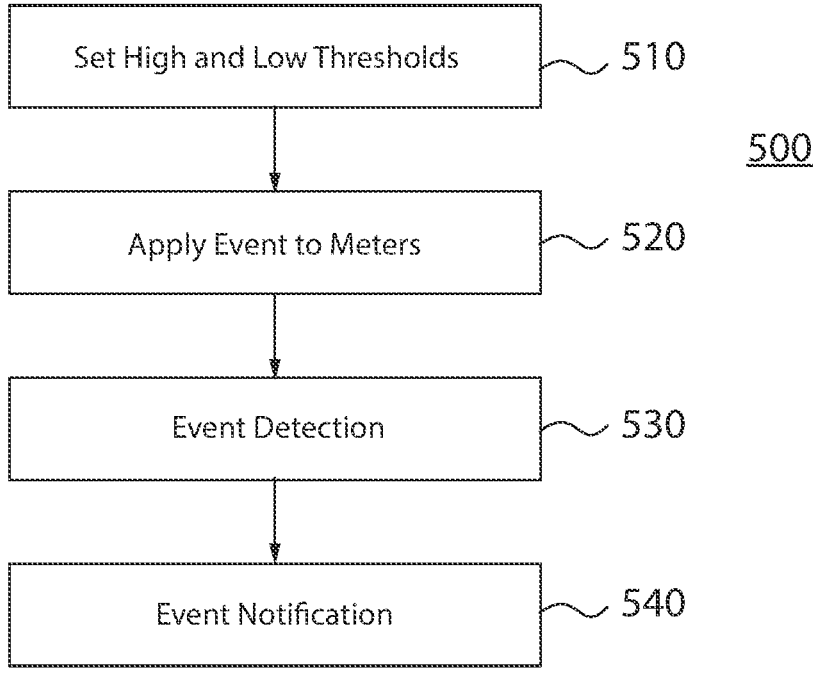
FIG. 5 is a flowchart illustrating a method for detecting violation of water usage guidelines in the central event management system of FIG. 2, according to an exemplary embodiment.

Referring now to FIG. 5, a flowchart 500 illustrating a method for using central event management system 210 for reducing manual efforts to validate monthly water consumption prior to a utility billing systems 116 billing their customers is shown, according to an exemplary embodiment. The method may be implemented by a computer processor of the central event management system 210 and/or one or more independent data stores, such as non-utility data management systems 122 and utility data management systems 110. The computer system implementing the method may be configured to include a processor configured to implement a computer program stored in nonvolatile memory to implement the functionality described herein.

Water utilities validate the reasonableness of measured monthly water consumption volumes prior to issuing bills so that customers do not get billed incorrectly. Incorrect water consumption volumes may get reported due to several causes. For example, the meter 150 may be read incorrectly or an incorrect meter resolution may be recorded in the utility data management systems 110. If the reported consumption falls outside a high and low threshold range, then a utility staff member must investigate the cause. In one utility, around 15,000 out of 150,000 meters require investigation each month.

The central event management system 210 system provides a way to reduce the manual effort associated with validating reported consumption. The utility creates an event condition for each meter that includes high and low thresholds. Using central event management system 210, a water utility assigns high and low thresholds through a utility client computer 114 for monthly water consumption for each meter in a step 510. The event can be applied to those specific meters within central event management system 210 in a step 520.

An event is detected in a step 530 when the monthly consumption is below the low or above the high threshold. When the monthly consumption is loaded into BEACON, the central event management system 210 generates an error report that gets sent to the utility client computer 114 in a step 540. Furthermore, advanced metering analytics system 120 can be configured to store the complete history of all events for each meter so that when the utility investigates, they can see if the high or low measurement is unusual or has occurred in the past.

For example, if a meter has consumed high volumes in the past then a new high consumption is likely to be correct. In this case the utility staff member might increase the high threshold. On the other hand, if the meter has never reported a high volume then further investigation is required. For example, the staff member might check the meter history maintained by advanced metering analytics system 120 to see if the meter resolution was changed recently. Or if the meter has a cellular endpoint then the staff member might check the device health, which is also maintained by advanced metering analytics system 120. Some frequently occurring manual checks could later be incorporated into the event condition.

Figure 6:
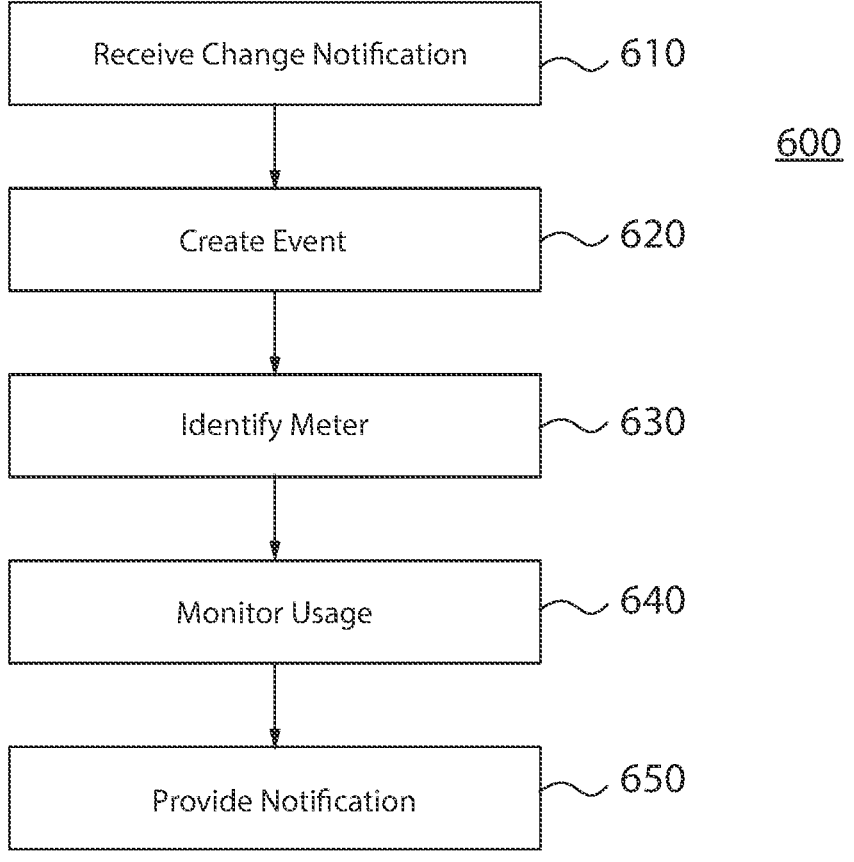
FIG. 6 is a flowchart illustrating a method for detecting violation of water usage guidelines in the central event management system of FIG. 2, according to an exemplary embodiment.

Referring now to FIG. 6, a flowchart 600 illustrating a method for using central event management system 210 for implementing before and after benchmarking is shown, according to an exemplary embodiment. The method may be implemented by a computer processor of the central event management system 210 and/or one or more independent data stores, such as non-utility data management systems 122 and utility data management systems 110. The computer system implementing the method may include a processor configured to implement a computer program stored in nonvolatile memory to implement the functionality described herein.

Before-and-After BAA benchmarking is the practice of comparing some performance metric before and after some change. This practice is very applicable to the area of water conservation since it is important to know which conservation actions are effective. For example, suppose a residential water consumer installs a high efficiency toilet in the hopes of reducing their water consumption. If the consumer can in fact determine that the new toilet saves money, they might be motivated to install them in other locations.

The central event management system 210 provides a way to implement before and after benchmarking. In a step 610, central event management system 210 receives a notification of a change. The change may be customer driven and received through a portal system 112, utility driven and received from a utility client computer system 114 and/or from another source.

An event condition is created in a step 620 to compare consumption before and after the change date, e.g. the date when the high efficiency toilet was installed. Accordingly, central event management system 210 is configured to have access to archival meter reading information, for example from data store 124. The event condition specifies the before and after comparison time periods, e.g. one month before and one month after. When enough time has passed, central event management system 210 computes and compares the consumption in a step 640 and notifies the consumer of the result in a step 650. For other types of change, e.g. installing a smart irrigation system, the before and after time periods might be one-month-after and same-month-one-year-before to allow for normal seasonal variation. These examples are not exhaustive.

As an example, before and after benchmarking is may be implemented by central event management system 210 based on information received from utilities and to governments. For example, a utility might want to understand the effectiveness of a water conservation campaign. The details of the campaign may vary from district to district. Advanced metering analytics system 120 manages consumption for all meters within a utility and so is capable of computing performance metrics for the utility, broken down by district, postal code, or street. Similarly, a government may want to understand the effectiveness of its policies. Advanced metering analytics system 120 manages consumption data for utilities in many states and foreign countries and so is capable of computing performance metrics at the country, state, and city levels.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. A computer-implemented system for validating meter data in a utility monitoring system based on streamed sensor data, comprising:

a metering analytics system configured to receive a stream of meter data received from sensors in or in proximity with utility meters, the meter sensor data being generated by the sensors; and a central event management system for validating meter sensor data in the streamed sensor data as it arrives in the stream of meter data from the sensors and prior to provision of the streamed sensor data to the metering analytics system based on a plurality of sequential sensor reads in the streamed sensor data, the central event management system validating meter sensor data by being configured to receive an invalidation event definition defining a sensor value usage invalidation threshold, apply the invalidation event definition to read messages received through the streamed sensor data, monitor read messages in the streamed sensor data to identify a first read message for a watched meter upon receipt of the first read message, identify an invalid meter satisfying the invalidation event definition based upon receipt of at least a second read message for the violating meter indicating that the meter sensor data is outside of a defined range for the sensor value usage invalidation threshold range, and output a processed data stream including a modified streamed sensor data that has been modified based on the identification.

2. The computer-implemented system of claim 1, wherein the first read message is replaced by the second read message wherein there is no indication that the invalid meter is inside of the defined range based on the at least second read message.

3. The computer-implemented system of claim 1, further including identifying a subset of meters to which the invalidation event definition is to be applied based on historical readings for the meters in the subset of meters and monitoring read messages in the streamed sensor data to identify a first read message for each meter in the subset of meters.

4. The computer-implemented system of claim 3, further including modifying the defined range based on the historical readings for the meter or sensor.

5. The computer-implemented system of claim 1, further including providing a notification to a utility associated with the invalid meter.

6. The computer-implemented system of claim 5, wherein the notification to the utility customer associated with the invalid meter is transmitted upon receipt of the at least second read message.

7. A computer-implemented method for validating meter data in a utility monitoring system based on streamed sensor data, comprising:

receiving a stream of meter data received from sensors in or in proximity with utility meters, the meter sensor data being generated by the sensors; and validating meter sensor data in the streamed sensor data based on a plurality of sequential meter reads in the streamed sensor data as it arrives in the stream of meter data from the sensors and prior to provision of the streamed sensor data to a metering analytics system, wherein validating the meter sensor data includes receiving an invalidation event definition defining a sensor value usage invalidation threshold, applying the invalidation event definition to read messages received through the streamed sensor data, monitoring read messages in the streamed sensor data to identify a first read message for a watched meter upon receipt of the first read message, identifying an invalid meter satisfying the invalidation event definition based upon receipt of at least a second read message for the violating meter indicating that the meter sensor data is outside of a defined range for the sensor value usage invalidation threshold range, and output a processed data stream including a modified streamed sensor data that has been modified based on the identification.

8. The computer-implemented method of claim 7, wherein the first read message is replaced by the second read message wherein there is no indication that the invalid meter is inside of the defined range based on the at least second read message.

9. The computer-implemented method of claim 7, further including identifying a subset of meters to which the invalidation event definition is to be applied based on historical readings for the meters in the subset of meters and monitoring read messages in the streamed sensor data to identify a first read message for each meter in the subset of meters.

10. The computer-implemented method of claim 9, further including modifying the defined range based on the historical readings for the meter or sensor.

11. The computer-implemented method of claim 7, further including providing a notification to a utility associated with the invalid meter.

12. The computer-implemented method of claim 11, wherein the notification to the utility customer associated with the invalid meter is transmitted upon receipt of the at least second read message.

* * * * *